April 9, 1957 R. B. BLAND 2,788,399
CONTROL MEANS FOR AN INDICATOR
Original Filed Sept. 4, 1951 5 Sheets-Sheet 1

INVENTOR.
REGINALD B. BLAND
BY
Lyon & Lyon
ATTORNEYS

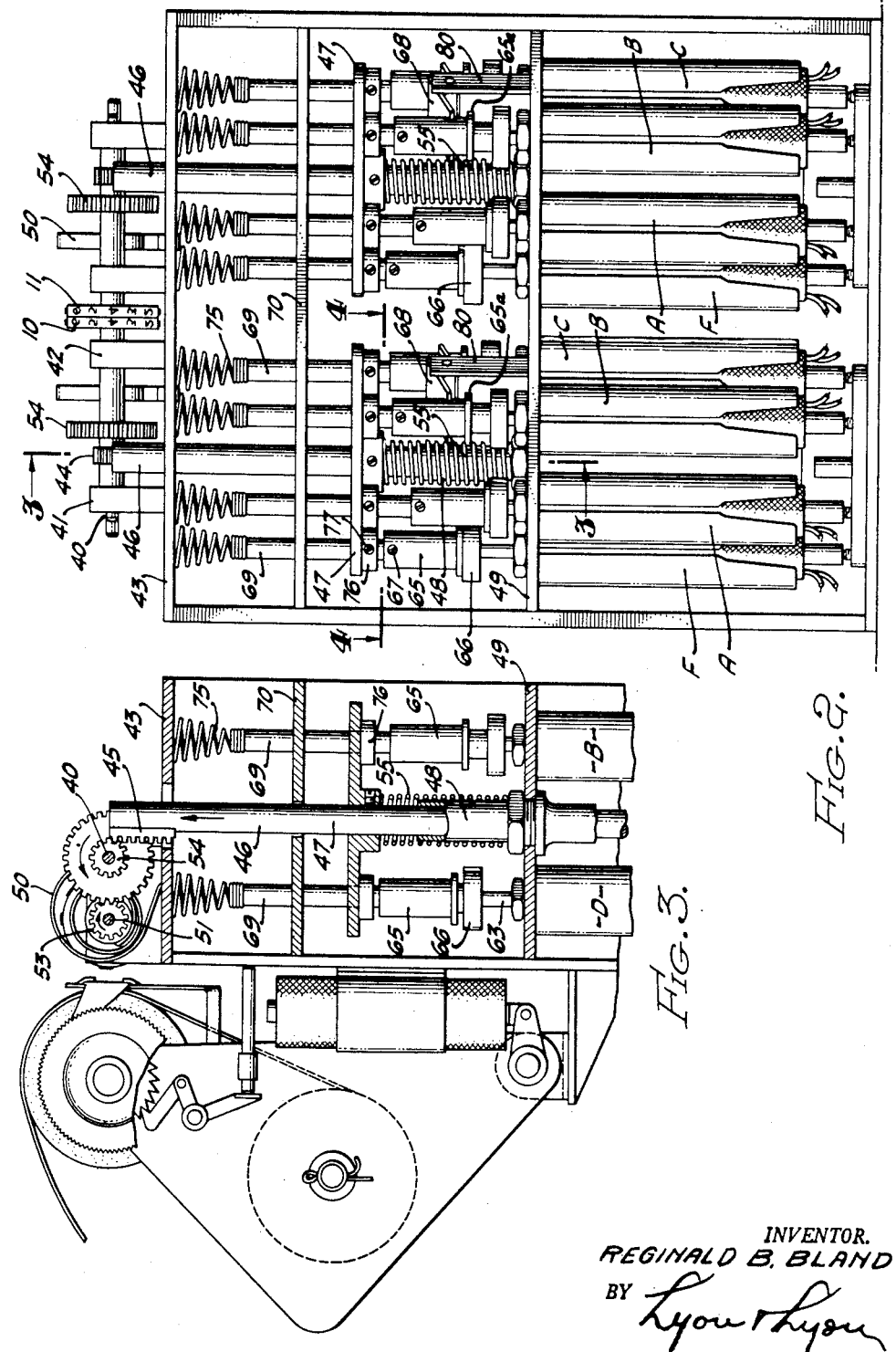

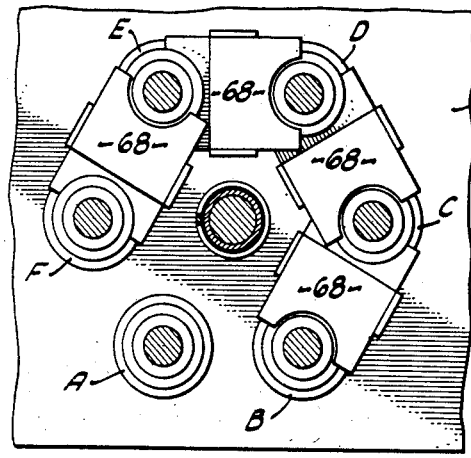
Fig. 4.
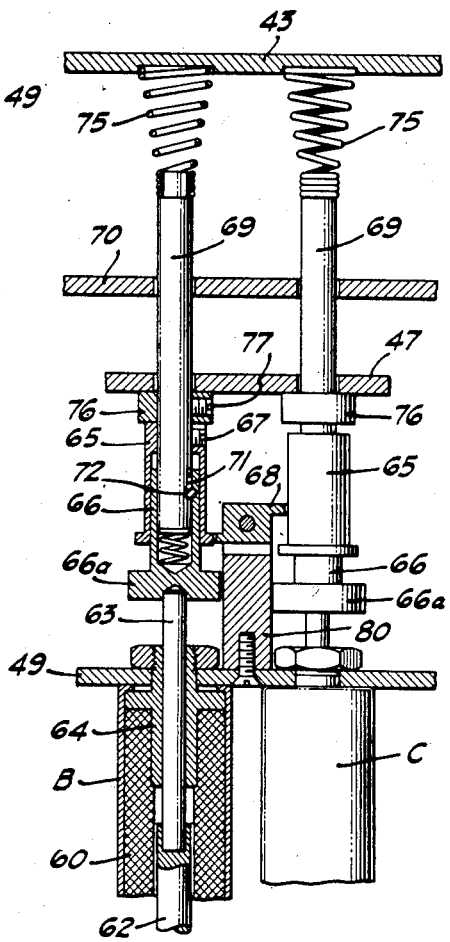
Fig. 5.
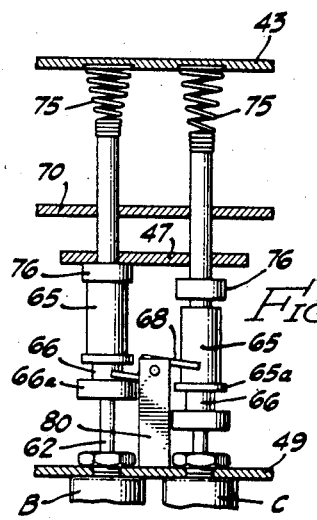
Fig. 6.
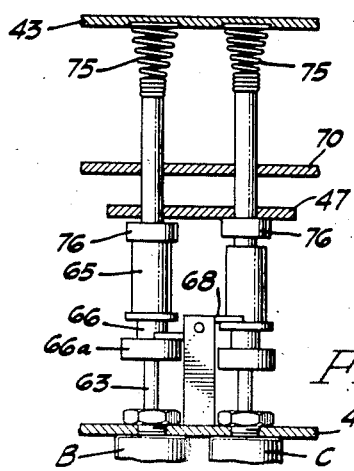
Fig. 7.
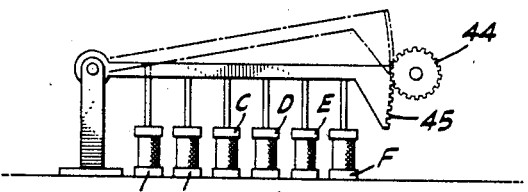
Fig. 8.
INVENTOR.
REGINALD B. BLAND
BY
ATTORNEYS April 9, 1957 R. B. BLAND 2,788,399
CONTROL MEANS FOR AN INDICATOR
Original Filed Sept. 4, 1951 5 Sheets-Sheet 4

INVENTOR
REGINALD B. BLAND
BY Lyon & Lyon
ATTORNEYS.

April 9, 1957  R. B. BLAND  2,788,399
CONTROL MEANS FOR AN INDICATOR
Original Filed Sept. 4, 1951  5 Sheets-Sheet 5

INVENTOR.
REGINALD B. BLAND
BY Lyon & Lyon
ATTORNEYS

United States Patent Office 2,788,399
Patented Apr. 9, 1957

2,788,399

CONTROL MEANS FOR AN INDICATOR

Reginald B. Bland, Los Angeles, Calif.

Original application September 4, 1951, Serial No. 244,875, now Patent No. 2,719,290, dated September 27, 1955. Divided and this application March 1, 1954, Serial No. 413,061

7 Claims. (Cl. 200—6)

The present invention relates to improved control means useful in various systems wherein it is desired to represent, either locally or remotely, the position of an element which is moved either manually or automatically, and constitutes a division of my copending application Serial No. 244,875, filed September 4, 1951, for Remote Indicating and Control Devices.

As will be gleaned from the following description, the present invention has universal applicability in systems wherein it is desired to transfer indications to a remote location.

The present invention contemplates the provision of improved means whereby, for example, the angular position of a shaft may be indicated either locally or remotely in terms of numbers in a digital system, the numbers being used either for indication purposes or for printing, as desired.

It is therefore an object of the present invention to provide improved means and techniques whereby the above indicated results are obtained.

A specific object of the present invention is to provide an improved controller in a follow-up system in which the controller is associated with a remotely controlled element, the position of such remotely controlled element being truly representative of the position of the manually actuated controller without the possibility of loss of synchronism between such element and controller as is possible in systems incorporating Selsyn drives.

Another specific object of the present invention is to provide an improved controller in a follow-up system of this character in which the position of a controlled element always bears a predetermined relationship with respect to a manually operable control member, even though there may be a failure in the power supply in the system.

Another specific object of the present invention is to provide an improved controller in apparatus of this character in which a record of indicator readings is obtained in the form of printed numerals, either locally or remotely.

Another specific object of the present invention is to provide an improved controller in a system of this character, as described in the next preceding paragraph in which an operator may obtain a printed record of indications.

A further specific object of the present invention is to provide an improved controller in a system of this character, mentioned above, characterized by the simplicity and inexpensiveness of the controller.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 2 is a view in side elevation of solenoid actuated mechanisms illustrated as solenoid coils in Figure 1;

Figure 1:
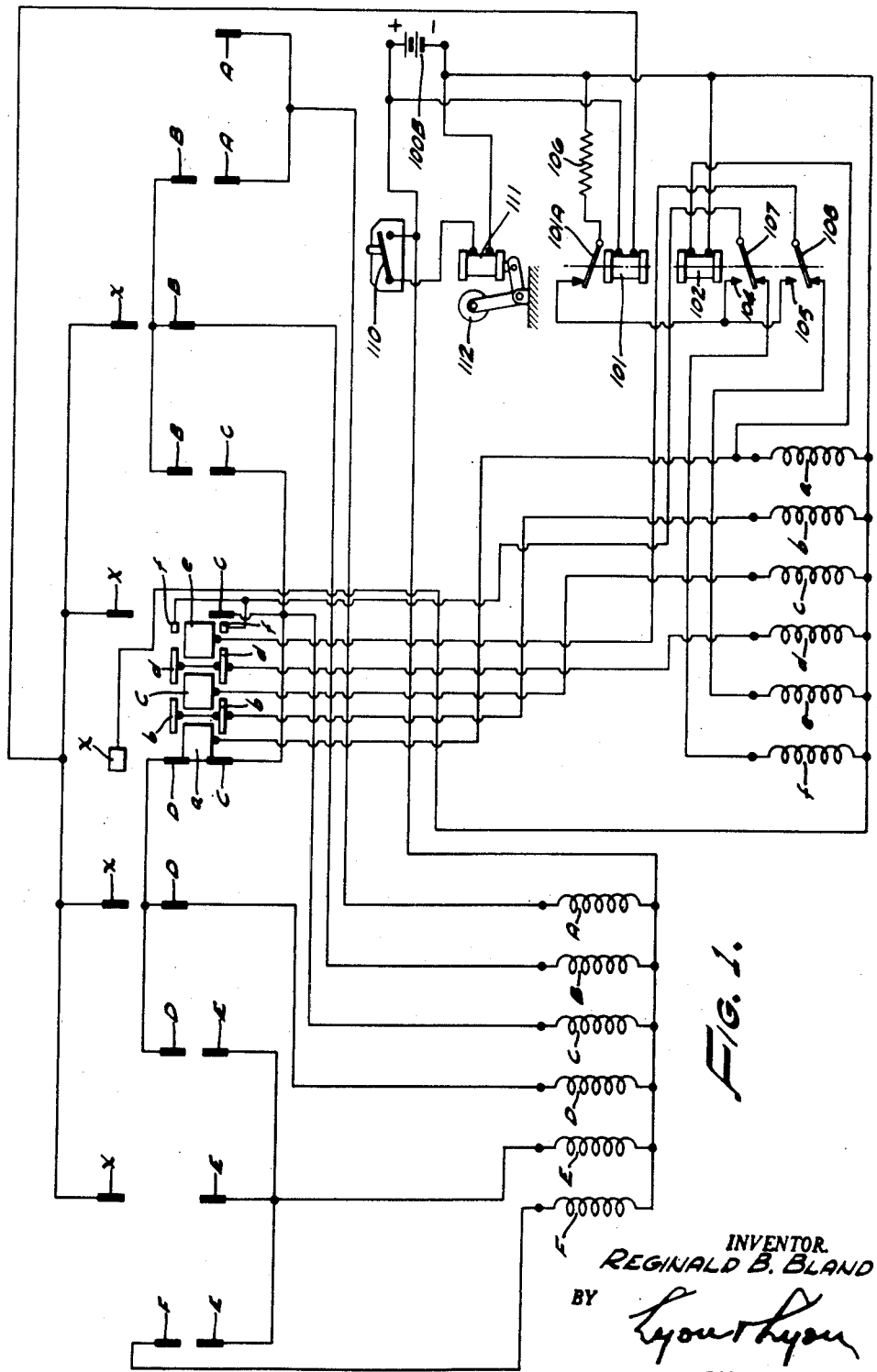
Figure 1 is a schematic representation of apparatus embodying features of the present invention.
Figure 9:
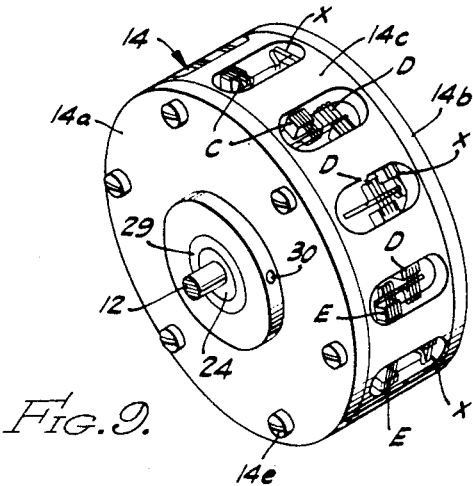
Figure 11:
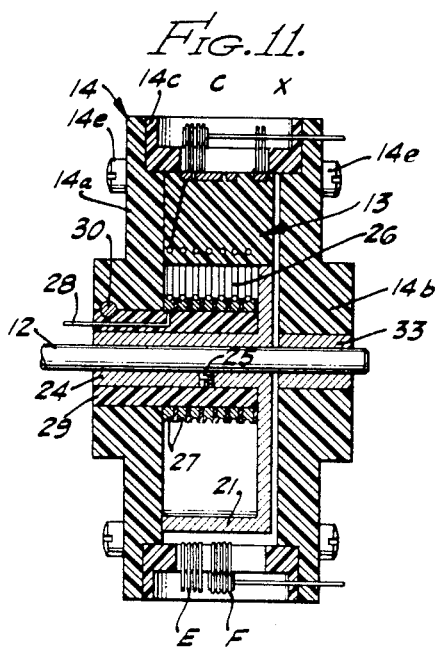
Figure 10:
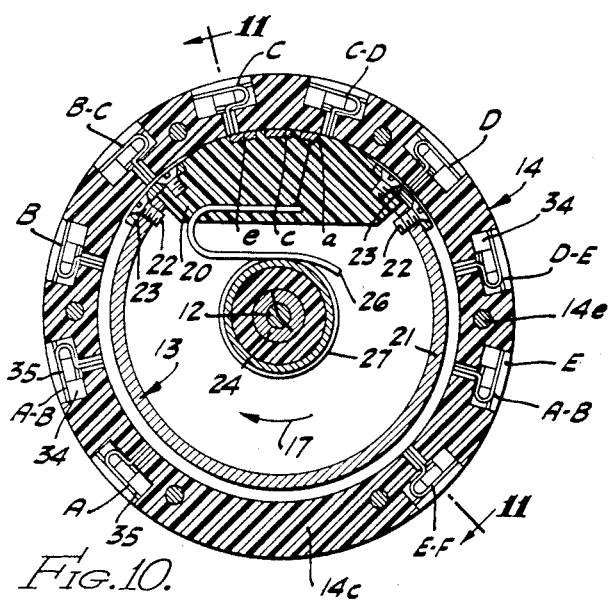
Figure 12:
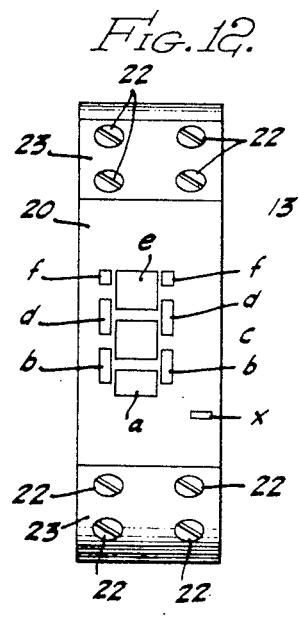
Figure 13:
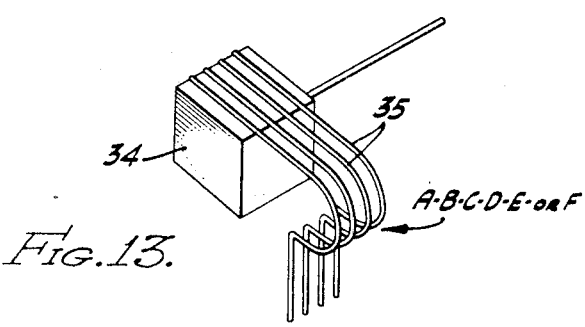
Figure 14:
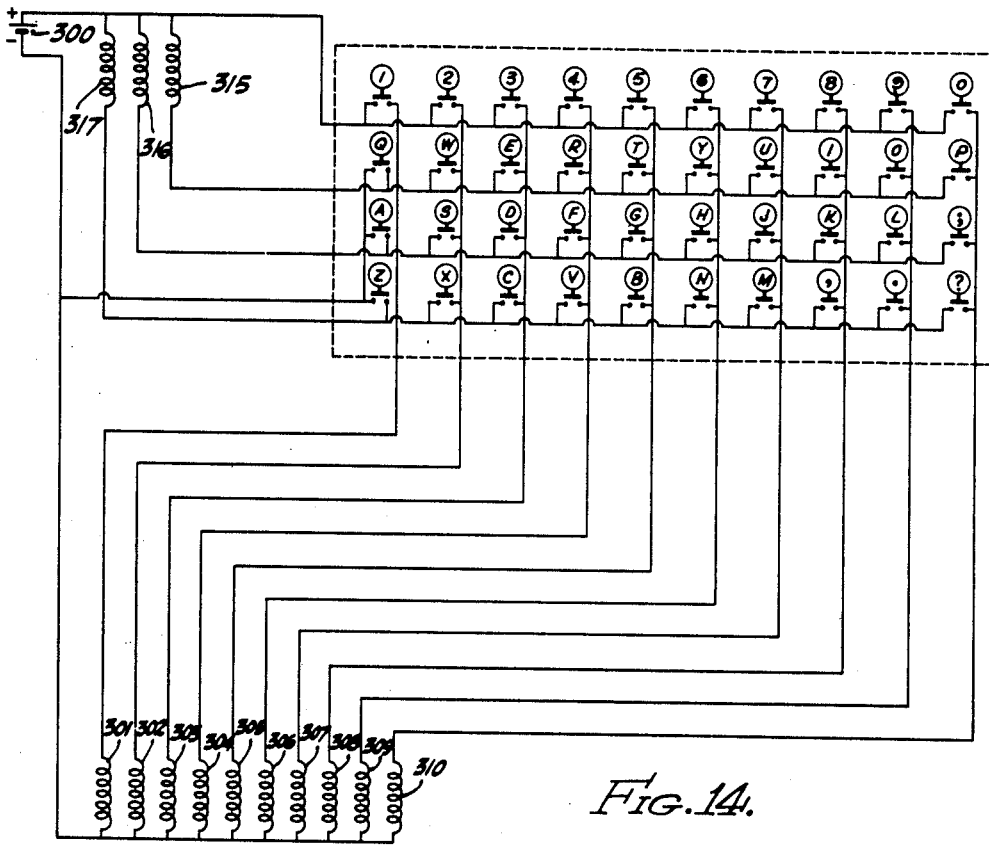
Figure 16:
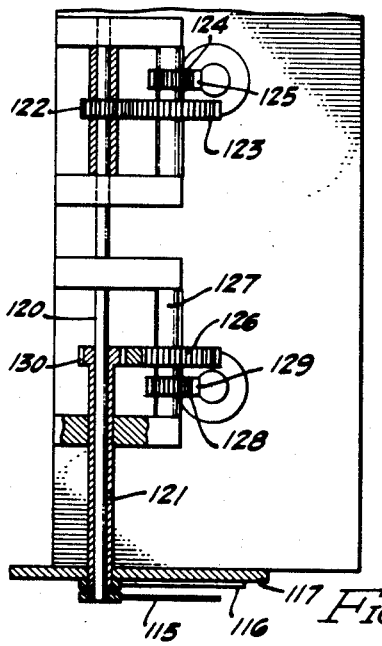
Figure 15:
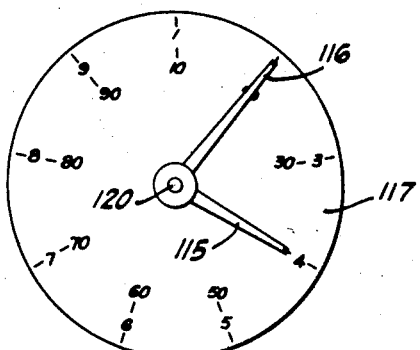

Figures 3 and 4 are views taken, respectively, on corresponding lines 3—3 and 4—4 in Figure 2;

Figure 5 is a view showing in enlarged form a portion of the apparatus illustrated in Figure 2 with certain parts sectioned for purposes of illustrating internal structure;

Figures 6 and 7 show parts of the structure illustrated in Figure 2 and serve to indicate the manner in which certain adjacent solenoid actuated mechanisms are interlocked;

Figure 8 illustrates a modified solenoid actuated mechanism for use in the system illustrated generally in Figure 1;

Figure 9 is a perspective view showing a control illustrated in schematic form in Figure 1;

Figure 10 is a longitudinal sectional view through the control shown in Figure 9;

Figure 11 is a sectional view taken substantially on the line 11—11 of Figure 10;

Figure 12 serves to illustrate the contact arrangement on the inner rotatable rotor of the control shown in Figure 9;

Figure 13 is a perspective view showing the character of the brushes mounted in the stator of the control for cooperation with the contacts in the rotor illustrated in Figure 12;

Figure 14 illustrates the manner in which the solenoid actuated mechanism of the character shown in Figure 2 may be connected for purposes of transmitting information of the character transmitted by present-day teletype systems; and Figures 15 and 16 relate to a modified structure for producing indications on a dial instead of two counter wheels as illustrated in Figure 2.

The apparatus described herein functions to produce a visible indication by means of the cooperating tens and units wheels 10, 11 in Figure 2, such wheels 10, 11 being moved to different positions in accordance with the adjusted position of the manually operated shaft 12 in Figure 11. These counter wheels 10, 11 indicate numbers from 0 to 99 continuously, when and as the shaft 12 is rotated through an angular distance somewhat less than 360°. The rotor shaft 12 mounts the rotor unit 13, illustrated in Figure 12, and which carries the insulated contacts *a, b, c, d, e,* and *f*, as well as an insulated so-called *x* contact. These contacts *a, b, c, d, e, f,* and *x* are interconnected, as illustrated in Figure 1, with other apparatus and cooperate with relatively stationary contacts on the stator 14, such stationary contacts comprising a series of contacts designated as A, B, C, D, E, F and X. The contacts on the rotor 13 are termed herein as the unit contacts while the contacts on the stator 14 are referred to herein as the tens contacts.

As is evident from the following description, the rotor contact *a* represents the numeral 0; the contacts *a, b,* considered jointly, represent the numeral 1; the rotor contact *b* represents the numeral 2; the rotor contacts *b, c,* considered jointly, represent the numeral 3; the contact *c* represents the numeral 4; the contacts *c, d,* considered jointly, represent the numeral 5; the contact *d* represents the numeral 6; the contacts *d, e,* considered jointly, represent the numeral 7; the contact *e* represents the numeral 8; and the contacts *e, f,* considered jointly, represent the numeral 9. On the other hand, the stator contact A represents the numeral 00; the stator contacts A, B, considered jointly, represent the numeral 10; the stator contact B represents the numeral 20; the stator contacts B, C, considered jointly, represent the numeral 30; the stator contact C represents the numeral 40; the stator contacts C, D, considered jointly, represent the numeral 50; the stator contact D represents the numeral 60; the stator contacts D, E, considered jointly, represent the numeral 70; the stator contact E represents the numeral 80; and the stator contacts E, F, considered jointly, represent the numeral 90.

In Figures 1 and 10 the various stator contacts are spaced transversely on the stator with the various rotor contacts subtending an angular distance somewhat less than the angular spacing of the stator contacts. Thus, for example, all of the rotor contacts a, b, c, d, e, and f cooperate first with the stationary stator contact A before any one of such rotor contacts engages the adjacently disposed group of stator contacts A, B. It is noted in Figure 10 that the group of rotor contacts are disposed between the stator contacts C on the one hand and C, D on the other hand, so that the mechanism in that position is effective to transmit the number 49, is being observed that the stator contacts C, D represent the number 50 and the stator contact C represents the number 40 and that the rotor contacts are in the position in Figure 10 where they are just about to leave the C contact upon rotation of the rotor in the direction indicated by the arrow 17 in Figure 10. Figure 1 represents the the condition wherein the rotor moves an incremental distance from the position represented in Figure 10 and in such case the rotor contacts e and f are no longer engaged by the stator contact C and the rotor contact a contacts the stator contacts C and D produce the next highest reading, namely 50, in the manner described hereinafter.

Various means may be used for mounting the different rotor and stator contacts in their relative positions, as shown, and for extending leads therefrom. The various rotor contacts a, b, c, d, e, f, and x are recessed in the block of insulating material 20 formed as a continuation of the annular metal flange 21 (Figures 10, 11) to which the block 20 is fastened by means of screws 22 and straps 23. The annular flange 21 comprises essentially the rim of a wheel having integrally formed hub 24 which, as shown in Figure 11, is fastened by means of set screw 25 to the shaft 12. Also recessed in the block of insulating material 20, which is in the form of a sector, are seven separately insulated wire brushes 26. These wire brushes 26 are supported as cantilevers as shown in Figure 10 and are resilient so that they are pressed into engagement with corresponding metal slip rings 27 (Figure 11), such slip rings 27 being insulated from one another for being connected to different leads 28 which extend outwardly of the control unit for connection to the external circuitry illustrated in Figure 1. These insulated slip rings 27 are stationarily mounted on the annular insulated bushing 29, which is keyed by means of key 30 to the stationary casing or stator 14. The stator 14 comprises a pair of circular end plates 14a, 14b spaced by the annular dished ring 14c. These three elements, i. e., 14a, 14b, and 14c, are secured as a unit by means of bolts 14e and are provided with the aligned bushings 24 and 33 for rotatably supporting the rotatable shaft 12. The various stator contacts A, B, C, D, E, F, and X are of the general form indicated in Figure 13 and are supported on a block of insulating material 34 (Figure 13) which, in turn, may be cemented to the annular ring 14c, with the ends of the spring wire contacts 35 projecting through the ring 14c for resilient engagement with the rotor contacts a, b, c, d, e, f, and x, as the case may be. These spring contacts 35 are interconnected in the manner illustrated in Figure 1. As a matter of fact, in the practical embodiment of the arrangement herein, as illustrated in Figure 11, four of such wire contacts 35 comprise one of the A, B, C, D, E, F contacts, as the case may be, whereas the X contact comprises only two of such spring wires 35, as indicated in Figure 11.

Now that the physical arrangement of rotor and stator contacts and their relationship have been described, a detailed description of the solenoid actuated mechanisms to which such contacts are connected is now given.

There are provided two groups of solenoid actuated mechanisms, one group corresponding to "tens" solenoids and having the reference numerals A, B, C, D, E, F while the other group is termed herein as "units" solenoids and have the reference numerals a, b, c, d, e, and f. Both groups, i. e., the tens and units groups, are of identical construction and for that reason a detailed description of the tens solenoids A, B, C, D, E, F, suffices as a description of the units group. Referring to Figures 2, 3, 4, 5, 6 and 7, the solenoid actuated mechanisms A, B, C, D, E, F, serve generally to rotate the counter wheel 10 a predetermined angular distance depending upon the particular mechanism or group of mechanisms energized. The counter or printing wheel 10 is mounted on the shaft 40 which is rotatably supported in the spaced bearings 41, 42 on the stationary frame 43. The shaft 40 carries a pinion gear 44 which is in constant mesh with the vertically movable rack 45. The rack 45 is mounted on the upper end of a rod 46 to which is keyed the circular plate 47. The rod 46 is slidably mounted in the guide sleeve 48 which in turn is affixed to the horizontal stationary frame member 49. In order to assure constant engagement between the pinion gear and the rack 45 so as to avoid backlash, a torque spring 50 (Figure 3) is provided. This torque spring 50 has its lower end attached to the stationary frame 43 and the other one of its ends attached to the rotatably supported shaft 51, which carries the gear 53, such gear 53 being in constant mesh with the larger gear 54 mounted on shaft 40.

The actuating plate 47 and hence the rack 45 are normally urged downwardly by the tension spring 55 (Figure 2) which has one of its ends affixed to the lower stationary frame member 49 and the other one of its ends affixed to the hub on the actuating plate 47. This circular actuating plate 47 may be moved upwardly different vertical distances depending upon which one of the solenoids A, B, C, D, E, F or group of the same is energized. For this purpose, the limitations of travel of the armatures of these solenoid actuated mechanisms are established so that the counter or printing wheel 10 reads 0 when the mechanism a is energized, the wheel 10 reads numeral 1 when the mechanisms a, b are both energized; the wheel 10 reads the numeral 2 when the mechanism b only is energized, etc. For this purpose, the armatures of the mechanisms b, c, d, e and f are mechanically interlocked in a manner described in detail later.

Each of the solenoids of the solenoid actuated mechanisms is constructed as shown in section in Figure 5 wherein the solenoid winding 60 is stationarily mounted on the frame member 49 and has a cooperating armature 62 to which is attached the plunger 63, such plunger being slidably mounted in the bushing 64. The upper end of the plunger 63 is recessed within the vertically movable sleeve 66. Such sleeve is slidably mounted within the cylinder 65. The cylinder 65 is adjustably secured by means of set screw 67 to the rod 69, which passes through aligned apertured portions in the actuating plate 47 and frame member 70. The rod 69 has a recessed portion 71 through which a motion limiting pin 72 passes, such pin 72 being affixed to the sleeve 66. The upper end of the rod 69 is engaged by the lower end of the coil compression spring 75 which has its upper end recessed in the frame member 43. The rod 69 also has adjustably mounted thereon the collar 76 maintained in position by set screw 77. Upon energization of the winding 60, the plate 67 is thus raised an amount which is permitted by means described in detail later. Such motion limiting means in general comprises pivoted levers 68 (Figures 5, 6 and 7) which serve to interlock adjacent solenoid actuated mechanisms. It is observed that the solenoid actuated mechanism A is not thus limited since it is not mechanically interlocked, but in such case the upward movement of the rod 69 for the mechanism A is limited by engagement of the armature 62 with the lower end of the bushing 64 (Figure 5). The interlocking plate 68 is interlocked on upstanding standards 80 fixed at their lower ends to the frame member 49. This plate 68 is pivoted at a point intermediate its ends and has oppositely extending portions which partially encircle on the one hand the tubular sleeve 66 and on the other hand the cylinder 65 of the adjacent mechanism. Thus, one end of the pivoted plate 68 is adapted to be engaged by the lower flange 66a on sleeve 66 while the other end of the plate 68 is adapted to be engaged by the flange 65a on the cylinder 65. When, as shown in Figure 6, the mechanism B is energized, the actuating plate 47 is moved upwardly a distance limited by the lefthand end of lever 68. Thereafter, when the mechanism C is energized, the plate 47 is raised an additional amount determined by the position which the lever 68 assumes at that time, it being noted that, since both mechanisms B and C are energized (Figure 7) the plate 47, while moved up an additional distance, may be moved still further upon subsequent deenergization of the mechanism B. Such step by step upward movement of the plate 47 results in rotation of the counter wheel 10 (Figure 2).

Similarly, provisions are made for energizing the mechanisms D, E, and F either singly or jointly with the mechanism having the next succeeding letter so as to rotate the counter wheel 10 to a correspondingly designated position. The same is true in the units mechanism which includes the mechanisms a, b, c, d, e and f.

The solenoid coils for mechanisms A, B, C, D, E, and F and a, b, c, d, e, and f are connected to the aforementioned contacts in the manner illustrated in Figure 1.

In Figure 1, one terminal of coils A, B, C, D, E, and F is connected to the positive terminal of voltage source 100. Similarly, one terminal of each of the coils a, b, c, d, e, and f is connected to the negative terminal of source 100. The other terminal of coils A, B, C, D, E, and F is connected, respectively, to the A, B, C, D, E, and F contacts. Likewise, the other terminals of coils a, b, c, d, e, and f are connected to contacts a, b, c, d, e, and f. In order to assure correct operation, the X and x contacts are provided. The X contacts are connected through the winding of relay 101 to the positive terminal of source 100. The x contact is connected to the negative terminal of source 100. The winding of relay 102 is connected between the negative terminal of source 100 and the a terminal. The normally closed switch 101A of relay 101 has its fixed contact connected to the normally open contacts 104, 105 of relay 102. The movable contact of switch 101A is connected to the negative terminal of source 100 through resistance 106. The movable switch elements 107, 108 serve normally to interconnect one terminal of coils f and e to corresponding contacts f and e. In other words, these connections are made to coils e and f only when relay 102 is deenergized, i. e., so long as the winding a is deenergized. Upon energization of relay 102, the current which would otherwise flow through windings e and f flows through the compensating resistance 106, provided, of course, that the relay 101 remains deenergized. The winding of relay 101 has one of its terminals connected to the positive terminal of source 100 and the other one of its terminals connected to the X contacts so that relay 101 is energized whenever the rotor x contact engages any one of the X contacts. In this respect, it is observed also that the x contact leads the a contact so that relay 101 becomes energized prior to energization of winding a for purposes described presently.

Once the apparatus is indexed, i. e., the wheels 10, 11 assume a stationary position which is representative of the angular position of the rotor shaft 12, a record may be made of the indication thus provided by the wheels 10, 11 by closing the switch 110 in Figure 1. In such case, the solenoid 111 is energized to produce movement of the printing roll 112 into engagement with the raised numerals on the wheels 10, 11 (Figure 2) for purposes of recording same. It is noted that the switch 110 and solenoid 111 are serially connected with the voltage source 100.

Referring to Figure 1, the rotor contact a is in engagement with the stator contacts C and D to indicate, by the simultaneous energization of the coils D and C, the numeral 50. It is observed at this time that the winding or coil a is also energized; and also the relay winding 102 is energized to operate the associated relay switches 107 and 108 to thereby assure disabling of circuitry used in energizing, under certain conditions, the solenoids e and f. This expedient assures the absence of a false reading of 59 under conditions when, either due to mechanical misalignment or wear or other causes, there may possibly be the situation wherein there is simultaneous engagement, on the one hand between the rotor contact a with the stator contacts C and D, and on the other hand between rotor contacts e and f with stator contact C. Under this particular situation, the switching resulting from rotor contacts e and f being in engagement with the stator contact C does not cause the energization of the coils e and f (indicating the digit 9) because of actuation of the relay switches 107 and 108 disabling the circuitry extending to the solenoids or coils e and f.

The likelihood of false readings is likewise prevented due to the use of the rotor x contact and cooperating X stator contact at the time of transition from 19 to 20, from 39 to 40, from 59 to 60, from 79 to 80 and from 99 to 00, namely at the time of transition from engagement of the rotor with a double stator contact to engagement of such rotor with a single stator contact. Thus, assuming the rotor is in engagement with the pair of stator contacts C and D and moves in the direction of the single D stator contact, then, to prevent false readings occasioned otherwise due to lack of mechanical alignment, wear and other similar reasons, the rotor x contact, which leads the rotor a contact, engages the stator X contact immediately before the rotor a contact engages the stator contact D. In this exact position, the relay winding 101 is energized to thereby open relay switch 101A. Immediately thereafter, when the rotor a contact engages the single D stator contact, the units coil or solenoid a is energized to indicate the digit 0; and relay 102 is operated to disable the circuit extending to the units coils e and f to thereby prevent a false reading of 9 in the event that the e and f rotor contacts, due to misalignment or other causes, is still in engagement with the pair of stator contacts C and D when the rotor a contact is in engagement with the single stator contact D. Further, since the rotor x contact is in engagement with the stator X contact, the C solenoid is prevented from being energized since in such case the relay switch 101A is open. Thus, at the time the a rotor contact engages the single D contact, a reading of 60 is assured, i. e., only the coil D and the coil a are energized.

Figures 15 and 16 serve to show means whereby indications otherwise produced using two wheels 10, 11 in Figure 2 may be displaced by a pair of rotating pointers 115, 116 which rotate about the same axis for cooperation with indicia on the dial face 117. For this purpose, the pointer 115 is mounted on the inner shaft 120 which extends through the sleeve 121 and which mounts the gear 122. The gear 122 is in mesh with driving gear 123. The gear 123 is mounted on the same rotatable shaft as the gear 124 which cooperates with a vertically movable rack bar 125, such rack bar 125 being attached to the actuating plate 47 in Figure 2. Thus, the pointer 115 indicates the tens while the pointer 116 is coupled in similar manner to indicate the units. The pointer 111 is mounted on the rotatable sleeve 121, such sleeve 121 carrying the gear 130 which is in mesh with the large gear 126. The gear 126 is mounted on a common shaft 127 with the gear 128. The gear 128 is for engagement with the rack 129 which is affixed to the actuating plate 47 of the units mechanism.

In the modified arrangement shown in Figure 14, the various characters on the keyboard of a conventional typewriter are associated with normally open switches, and such switches may be considered to have the correspondingly designated reference characters, i. e., 1, 2, 3, 4, 5, 6, 7, 8, 9, 0, Q, W, E, R, etc., as shown in Figure 14. These switches may be considered as being divided into four layers or series. The first layer of switches, i. e., 1, 2, 3, 4, 5, 6, 7, 8, 9, 0, each have each one of their terminals connected to the positive terminals of voltage source 300. The other terminals of such switches are connected respectively to one terminal of solenoid coils 301, 302, 303, 304, 305, 306, 307, 308, 309 and 310, with the common lead of each of such coils being returned to the negative terminal of voltage source 300. These coils 301–310, both inclusive, may be considered to be an assembly of coils as represented by the coils A, B, C, D, E, and F in Figure 4 with, of course, mechanical interlocking between the actuating mechanisms as described. The second layer or deck of switches Q, W, E, R, T, Y, U, I, O and P each have one of their terminals connected through the solenoid coil 315 to the positive terminal of source 300, the other terminal of switch Q being returned to the negative terminal of source 300, whereas the other terminals of switches W, E, R, T, Y, U, I, O, and P are connected to terminals of coils 302, 303, 304, 305, 306, 307, 308, 309, 310, respectively. In similar manner, the third layer or deck of switches A, S, D, F, G, H, P, K, L, ; have one of their terminals connected through solenoid coil 316 to the positive terminal of source 300, the other terminal of switch A being connected to the negative terminal of source 300, whereas the other terminals of switches S, D, F, G, H, J, K, L, and ; are connected respectively to one terminal of coils 302, 303, 304, 305, 306, 307, 308, 309, 310; similarly, the fourth layer or deck of switches each has one of its terminals connected through solenoid coil 317 to the positive terminal of voltage source 300, the other terminal of the switch Z being connected directly to the negative terminal of source 300, whereas the other terminals of switches X, C, V, B, N, M, comma and question mark are connected respectively to coils 302, 303, 304, 305, 306, 307, 308, 309, 310. Whereas, as mentioned before, the coils 301—310, inclusive, may be assembled as shown in Figure 4, with their actuating mechanisms interlocked, the solenoid coils 315, 316, 317 may likewise be interlocked and correspond with the other set of coils illustrated in Figure 2. In other words, the solenoid actuated mechanism which include the coils 301—310, inclusive, move the tens wheel 10 (Figure 2) to different adjusted positions depending upon which one of such coils is energized, whereas the coils 315, 316, 317 effect movement of the units wheel 11 to correspondingly different adjusted positions. By this means, the forty characters illustrated in Figure 14 correspond to one of forty different numbers, which is indicated by the cooperating tens and units wheels 10 and 11.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A control device of the character described having a rotor and a stator; said stator comprising a first series of circumferentially arranged contacts, a second series of circumferentially arranged contacts and a third series of circumferentially arranged contacts; said rotor having a first series of circumferentially arranged contacts, a second series of circumferentially arranged contacts and a third series of circumferentially arranged contacts, said second and third series of contacts on said rotor overlying and being disposed on opposite sides of said first series of contacts, corresponding angularly positioned ones of said second and third series of contacts on said rotor being interconnected, an auxiliary contact mounted on said rotor; said first, second and third series of contacts on said rotor lying intermediate the circumferential spacing of adjacent contacts of both said first and second series of contacts on said stator, said auxiliary contact on said rotor being disposed laterally of said first series of contacts on said rotor and leading, in a circumferential direction, the foremost one of said first series of contacts on said rotor, and said auxiliary contact on said rotor engaging with contact, in succession, individual contacts in said third series of contacts on said stator upon rotation of said rotor.

2. A control device of the character described comprising a stator and a rotor; said rotor having a first series of contacts, a second and a third series of contacts on said rotor disposed laterally on opposite sides of said first series of contacts with corresponding angularly positioned ones of said second and third series of contacts overlying two adjacent contacts in said first series, correspondingly angularly positioned contacts of said second and third series of contacts on said rotor being interconnected; said stator having a first and a second series of circumferentially arranged contacts thereon, each contact of said first series of contacts on said stator bridging the lateral distance between adjacent contacts of said first and second series of contacts on said rotor, each contact of said second series of contacts on said stator bridging corresponding angularly positioned ones of laterally disposed contacts of said first and third series of contacts on said rotor, and all of the mentioned contacts on said rotor extending circumferentially a distance substantially equal to the circumferential spacing of contacts in said first or second series of contacts on said stator.

3. The arrangement set forth in claim 2 in which said stator includes a third series of contacts and said rotor has an auxiliary contact which leads in a circumferential direction the foremost one of the contacts of said first series of contacts on said rotor, with said auxiliary contact on said rotor bridging, in succession, individual contacts of said third series of contacts on said stator upon rotation of said rotor with respect to said stator.

4. A control device of the character described comprising a stator and a rotor; said rotor having a first series of circumferentially arranged contacts, a second and a third series of contacts on said rotor with corresponding contacts of said second and third series lying on opposite sides of a pair of contacts of said first series and overlapping the same, said stator having a first and a second series of circumferentially arranged contacts, all of said contacts on said rotor lying substantially between adjacent contacts of both said first and second series of contacts on said stator, with a corresponding angularly positioned contact of said first series of contacts on said rotor interconnecting contacts of said first and second series on said rotor and contacting only a particular contact in said first series of contacts on said rotor, and a contact in said second series of contacts on said stator bridging contacts in said first and third series of contacts on said rotor and contacting only one contact in said first series of contacts on said rotor.

5. The arrangement set forth in claim 4 in which said rotor includes an auxiliary contact, said stator includes a third series of contacts, said auxiliary contact leading in a circumferential direction the foremost one of the contacts of said first series on said rotor and contacting in succession the individual contacts of said third series on said stator upon rotation of said rotor with respect to said stator.

6. A control device of the character described comprising a rotor and a stator, said rotor having a first series of circumferentially arranged contacts, a second and a third series of circumferentially arranged contacts with corresponding angularly positioned contacts of said second and third series mounted on opposite sides of said contacts of said first series of contacts and bridging the circumferential distance between adjacent contacts of said first series of contacts, the foremost contact of said first series of contacts leading in a circumferential direction the first ones of said contacts of said second and third series of contacts, said stator having a first and a second series of circumferentially arranged contacts, with all of the above-mentioned contacts on said rotor being disposed between adjacent contacts of both said first and second series of stator contacts.

7. The arrangement set forth in claim 6 in which said rotor includes an auxiliary contact disposed laterally of the contacts of said first, second and third series of contacts on said rotor with said auxiliary contact leading in a circumferential direction said foremost contact of said first series of contacts, and said stator having a third series of circumferentially arranged contacts contacting in succession said auxiliary contact on said rotor upon rotation of said rotor with respect to said stator.

References Cited in the file of this patent

UNITED STATES PATENTS

| | | |
|---|---|---|
| 1,306,410 | Dawson et al. | June 10, 1919 |
| 2,620,981 | Benson et al. | Dec. 9, 1952 |

FOREIGN PATENTS

| | | |
|---|---|---|
| 207,973 | Germany | Mar. 12, 1909 |
| 76,633 | Austria | May 15, 1918 |
| 394,789 | Great Britain | July 6, 1933 |